United States Patent [19]
Munch

[11] Patent Number: 6,040,532
[45] Date of Patent: Mar. 21, 2000

[54] VEHICLE OCCUPANT WEIGHT SENSOR

[75] Inventor: Carl A. Munch, Troy, Mich.

[73] Assignee: TRW Inc., Lyndhurst, Ohio

[21] Appl. No.: 09/178,945

[22] Filed: Oct. 26, 1998

[51] Int. Cl.$^7$ .................................................. G01G 19/52
[52] U.S. Cl. ................... 177/144; 177/199; 177/DIG. 6; 177/210 R; 180/273; 340/667; 73/800; 356/32; 280/735
[58] Field of Search .................................. 177/132, 136, 177/144, DIG. 6, 199, 200, 210 R; 280/735; 200/85 R, 85 A; 180/273; 340/667; 73/800; 356/32

[56] References Cited

U.S. PATENT DOCUMENTS

| | | | |
|---|---|---|---|
| 3,672,699 | 6/1972 | De Windt | 280/735 |
| 4,405,025 | 9/1983 | Yanagita et al. | 177/210 FP |
| 4,560,016 | 12/1985 | Ibanez et al. | 177/210 R |
| 4,625,819 | 12/1986 | O'Neill | 177/212 |
| 4,691,793 | 9/1987 | Kumakura et al. | 177/50 |
| 4,781,056 | 11/1988 | Noel et al. | 73/800 |
| 5,069,299 | 12/1991 | Haroutel | 177/25.15 |
| 5,141,065 | 8/1992 | Maxwell et al. | 177/210 R |
| 5,260,520 | 11/1993 | Muhs et al. | 177/210 R |
| 5,573,269 | 11/1996 | Gentry et al. | 280/735 |
| 5,624,132 | 4/1997 | Blackburn et al. | 280/735 |
| 5,626,359 | 5/1997 | Steffens, Jr. et al. | 280/735 |
| 5,698,828 | 12/1997 | Perkins | 200/61.54 |
| 5,739,757 | 4/1998 | Gioutsos | 340/667 |
| 5,810,392 | 9/1998 | Gagnon | 280/735 |
| 5,878,620 | 3/1999 | Gilbert et al. | 280/735 |
| 5,904,219 | 5/1999 | Anahid et al. | 180/273 |
| 5,927,427 | 7/1999 | Sewell et al. | 180/273 |
| 5,975,568 | 11/1999 | Speckhart et al. | 280/735 |

*Primary Examiner*—Randy W. Gibson
*Attorney, Agent, or Firm*—Tarolli, Sundheim, Covell, Tummino & Szabo L.L.P.

[57] ABSTRACT

A weight sensor (10) for sensing a load applied to a vehicle seat (14) includes a light source (16) for providing light and detectors (18, 20, 22, 24) for detecting light received from the light source (16). A member (50, 52, 54, 56) impedes the passage of light between the light source (16) and the detectors (18, 20, 22, 24) in response to the load applied to the seat (14). The light detectors (18, 20, 22, 24) provide a signal to a control device (27) indicative of the amount of light received. In response to the light detector signals, the control device (27) determines a value in accordance with the load applied to the seat (14).

18 Claims, 2 Drawing Sheets

VEHICLE OCCUPANT WEIGHT SENSOR

TECHNICAL FIELD

The present invention relates to a weight sensor, and more particularly to a weight sensor for a vehicle seat which senses light to determine the weight of a load on the vehicle seat.

BACKGROUND OF THE INVENTION

There are numerous types of weight sensors for determining the weight of a load applied to a vehicle seat. Some weight sensors include a spring structure mounted to a vehicle seat. The spring structure deflects a predetermined amount in response to a load applied to the vehicle seat, such as due to an occupant sitting in the seat. Weight may be determined, for example, by measuring the amount of deflection of the spring structure. In one type of device, deflection of the spring structure may be measured based upon inductive changes in a differential transformer connected to the vehicle seat. The differential transformer converts the weight applied to the seat and transferred to the spring structure into a voltage. The voltage is indicative of the weight of vehicle occupant.

SUMMARY OF THE INVENTION

The present invention is directed to a weight sensor for a vehicle seat that includes a light source for providing a predetermined amount of light. A light detector detects light from the light source and provides a signal indicative thereof. The weight sensor also includes a member for mounting to a vehicle seat and impeding the passage of light between the light source and the light detector in response to a load applied to the vehicle seat. A control device is electrically coupled to the light detector. The control device determines, in response to the light detector signal, a value in accordance with the load applied to the vehicle seat.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
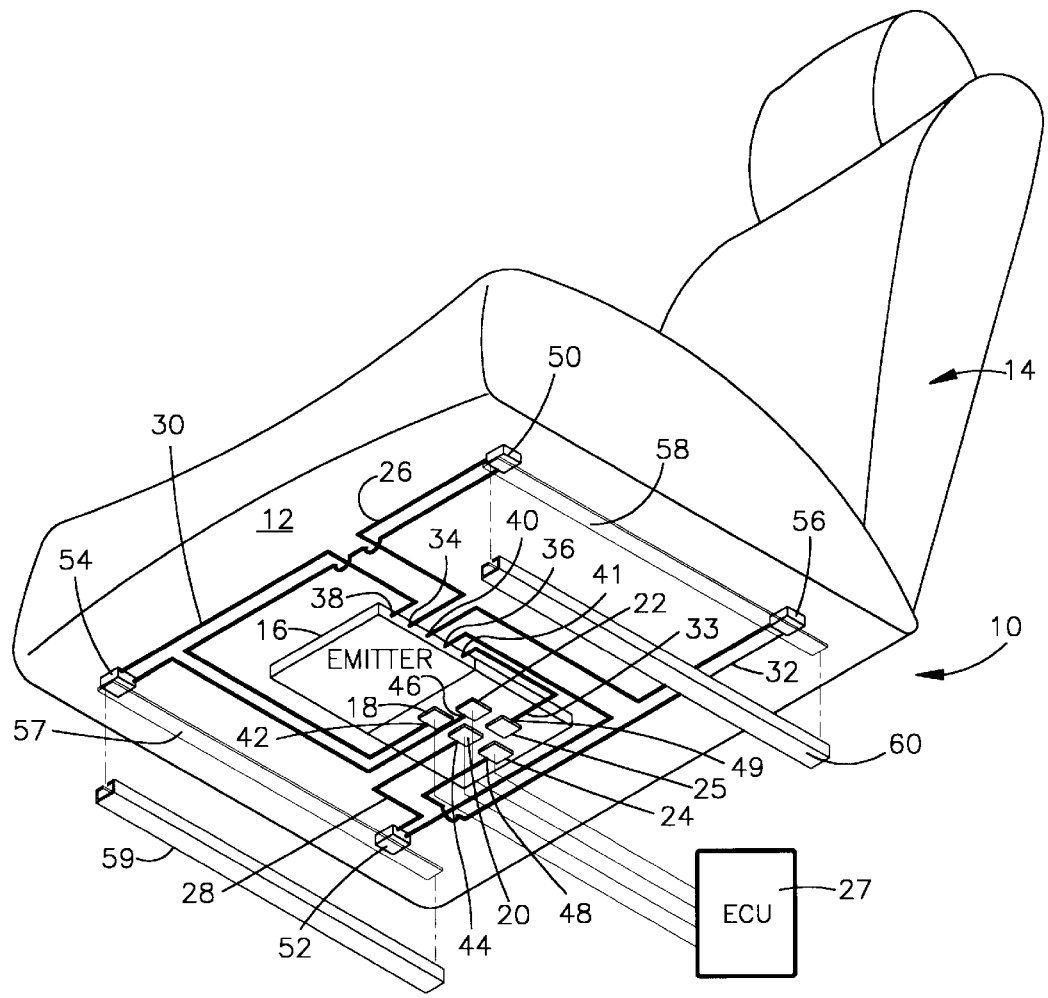
FIG. 1 is a schematic perspective view of an embodiment of a weight sensor in accordance with the present invention.

FIG. 1 illustrates a preferred embodiment of a weight sensor, generally indicated as 10, mounted to a lower portion 12 of a vehicle seat 14. The weight sensor 10 includes a light source 16, such as a conventional high power light emitter, for emitting a predetermined amount of light, preferably in the infrared spectrum.

A plurality of light detectors 18, 20, 22, 24 and 25 are mounted to the lower portion 12 of the vehicle seat 14. The detectors 18, 20, 22, 24 and 25 preferably form a detector array located adjacent the emitter 16. The detector array and the emitter 16 may be combined into an integrated module. Alternatively, the detectors 18, 20, 22, 24 and 25 may be separate modules at spaced apart locations of the seat 14. The detectors 18, 20, 22, 24 and 25 detect light received by the detectors from the emitter 16.

The detectors 18, 20, 22, 24 and 25 are electrically coupled, suitably by connecting wires, to an electronic control unit (ECU) 27. Preferably, the ECU 27 is a microcomputer, but may also comprise a plurality of discrete circuits, circuit components, and/or an application specific integrated circuit (ASIC) configured to accomplish desired functions. The ECU 27 also may be configured for controlling additional systems of a vehicle, such as a vehicle occupant protection system.

A plurality of light guides 26, 28, 30, 32 and 33 are connected between the light source 16 and each respective detector 18, 20, 22, 24 and 25. Each light guide 26, 28, 30, 32 and 33 may be a conventional light pipe or an optical cable, such as a fiber optic cable having one or more fibers. Each light guide 26, 28, 30, 32 and 33 provides a path for the passage of light between the light source 16 and the detectors 18, 20, 22, 24 and 25. Each light guide 26, 28, 30, 32 and 33 has a first end 34, 36, 38, 40 and 41 attached to an output of the emitter 16. Each light guide 26, 28, 30, 32 and 33 also has a second end 42, 44, 46, 48 and 49 attached to each respective light detector 18, 20, 22, 24 and 25.

The weight sensor 10 further includes members 50, 52, 54 and 56 associated with the light guides 26, 28, 30 and 32, respectively. The members 50, 52, 54 and 56 impede the passage of light between the light source 16 and the respective light detectors 18, 20, 22 and 24 in response to the load applied to the vehicle seat 14, such as by altering a condition of the light pipe or fiber. More specifically, a portion of each light guide 26, 28, 30 and 32 intermediate its first and second ends is positioned with in its associated respective member 50, 52, 54 and 56, suitably between a movable portion of each member and the lower seat rails 57 and 58. The seat rails 57 and 58 are mounted to the lower portion 12 of the seat 14 and are adjustably attached to mounting tracks 59 and 60, which are secured to the vehicle body. As a load is applied to the seat 14, such as due to an occupant sitting in the seat 14, each member 50, 52, 54 and 56 impedes the passage of light between the light source 16 and each respective detector 18, 20, 22 and 24 by some predetermined amount. The detectors 18, 20, 22 and 24 provide signals to the ECU 27 according to the amount of light detected thereby.

The light detector 25 preferably does not include an associated light impeding member as do the other light detectors 18, 20, 22 and 24. The light detector 25 provides a reference signal to the ECU 27, which may be used for compensation purposes as described below.

Figure 2:
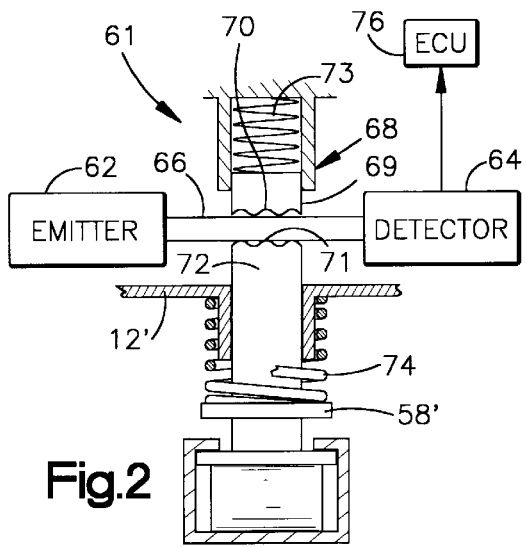
FIG. 2 is a schematic view of another embodiment of a weight sensor in accordance with the present invention.
Figure 3:
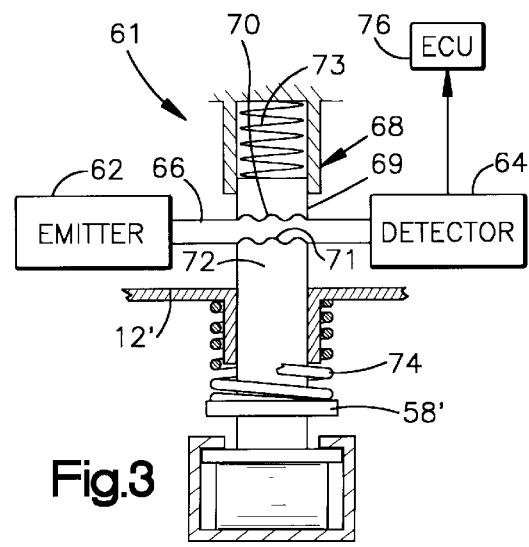
FIG. 3 is a view of the weight sensor of FIG. 2, illustrating an alternative condition of the sensor.

Referring to FIGS. 2 and 3, a weight sensor 61 is schematically illustrated in accordance with another embodiment of the present invention. The weight sensor 61 includes an emitter 62 for emitting a predetermined amount of light and a light detector 64 for detecting light from the emitter 62. The light is transmitted from the emitter 62 to the detector 64 through a resilient compressible optical cable 66, such as a fiber optic cable which may comprise one or more fibers. The optical cable 66 is connected between the emitter 62 and the light detector 64.

The weight sensor 61 also includes an assembly 68 for impeding the passage of light through the optical cable 66 according to a load applied to the seat, schematically illustrated as 12'. Preferably, the assembly 68 is mounted to the vehicle seat 12' and a lower seat rail 58'. The assembly 68 includes a plunger member 69 which moves a predetermined amount according to the applied load. In response to the applied load, the plunger member 69 bends or compresses the optical cable 66 between a lower edge 70 of the plunger member 69 and an upper edge 71 of an opposed plunger support member 71. The plunger support member 71 is connected with the lower seat rail 58', as shown in FIG. 3.

The plunger member 69 may be biased by a spring 73 which may be mounted within the seat 14. The spring 73 has a known spring constant. The spring 73 should be selected, at least in part, based on the deformability of the optical cable 66 and the configuration of the assembly 68.

In addition and/or in the alternative, a spring 74 may be associated with the assembly 68, suitably extending between the seat 12' and the seat rail 58'. The spring 74 controls the amount which the assembly 68 compresses the cable 66 due in response to an applied load. The spring constant of the spring 74 will, at least in part, determine the relative movement of the plunger member with respect to the cable 66 for a given applied load. In this way, the spring 74 will be the dominant factor in determining compression versus weight ratio for the apparatus 61. Typically, a stiffer spring 74 is required for the embodiment where the cable 66 is being bent toward its critical angle than an embodiment where the cable being pinched. The springs 73 and/or 74 also may pre-load the assembly 68 to deform the cable 66 so that the system will be more responsive to the applied load. Pre-loading the assembly 68 also provides for sensing a negative load condition, such as due to errors or torque.

In the embodiment illustrated in FIGS. 2 and 3, the mating edges 70 and 71 of the plunger 69 and corresponding support member 72, respectively, bend a portion of the cable 66. Preferably, both the lower edge 70 of the plunger member 69 and the corresponding upper edge 71 of the plunger support member 72 include mating grooves or corrugations which facilitate the bending and/or deformation of the optical cable 66. The grooves are dimensioned and configured to bend the cable 66 to provide for a loss of internal reflection as its critical angle is exceeded. Accordingly, the assembly 68 bends the cable 66 to reduce the intensity of the light transmitted through the cable proportional to the applied load. Alternatively, the reduction in transmission of light through the cable 66 may be provided by effectively pinching the cable by the assembly 68. Regardless of the configuration of the assembly 68, it is desirable to provide over-range stops (not shown) to inhibit plastic deformation of the cable 66 under heavy loads as well as to inhibit excessive shearing when the load is removed.

The detector 64 provides a signal indicative of the intensity of light received from the emitter 62. The signal is supplied to an electronic control unit (ECU) 76, such as described above.

It is to be understood and appreciated that a single detector 64 and plunger assembly 68 are shown in FIGS. 2 and 3 for purposes of illustration and to simplify the description. It further will be appreciated that a plunger assembly, such as the assembly 68, may be used in connection with a plurality of optical cables and associated light detectors, such as in the system 10 shown in FIG. 1.

Figure 4:
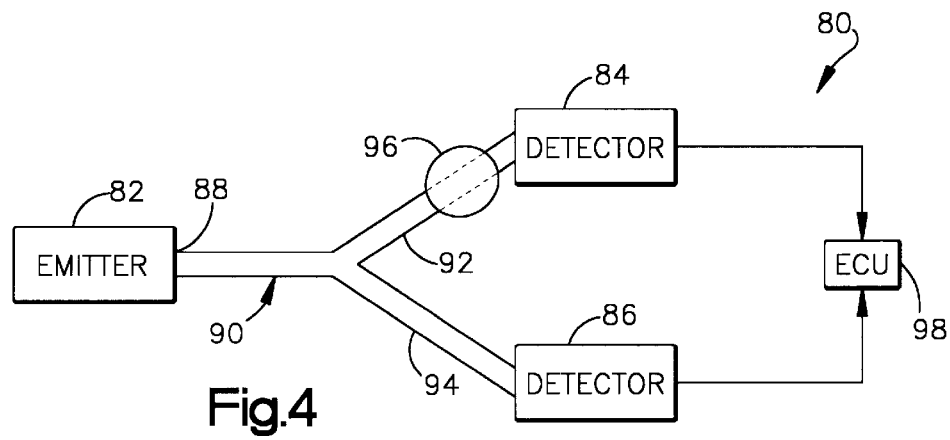
FIG. 4 is a schematic view of yet another embodiment of a weight sensor in accordance with the present invention.

FIG. 4 illustrates yet another embodiment of a weight sensor, generally indicated as 80, in accordance with the present invention. The weight sensor 80 includes a light emitter 82 optically coupled to a first light detector 84 and a reference light detector 86. Specifically, a first end 88 of an optical cable 90 is connected to an output of the emitter 82. The optical cable 90 is split into two branches 92 and 94, which are connected to the light detector 84 and the reference light detector 86, respectively. Preferably, each branch 92 and 94 receives half of the light emitted from the emitter 82 through the optical cable 90. The trunk of the optical cable 90 may be split into the branches 92 and 94 by a conventional beam splitter. It will be understood and appreciated that the detector 84 and the reference detector 86 also may receive equal amounts of light from the emitter 82 through separate optical cables, such as shown in the embodiment of FIG. 1.

A structure 96, such as the assembly 68 shown and described with respect to FIGS. 2 and 3, impedes the passage of light through the first branch 92 according to a load applied to the vehicle seat (not shown). No corresponding member is associated with the second branch 94 of the optical cable 90. Accordingly, light passes substantially unimpeded through the second branch 94.

The light detectors 84 and 86 are coupled to an ECU 98. The detectors 84 and 86 provide signals indicative of the amount of light received from the emitter 82 through their respective branches 92 and 94. The signal from the reference detector 86 provides a signal indicative of a zero load condition. Any changes in the reference signal typically will reflect environmental changes, such as changes in temperature, or the effects of wear and aging on the system 80. Because the detectors 84 and 86 are preferably identical components, they will be influenced similarly by such changes and effects. The reference signal may also be used to compensate for coupling losses between the emitter 82 and optical cable 90 and between the detector 84 and the cable branch 92. This is because the signal from the reference detector 86 includes coupling losses between the emitter 82 and optical cable 90 and between the detector 86 and the branch 94. Accordingly, the signal from the reference detector 86 provides a baseline, based upon which the ECU 98 may actively compensate the signal from the detector 84 for environmental changes and inefficiencies of the sensor components.

Figure 5:
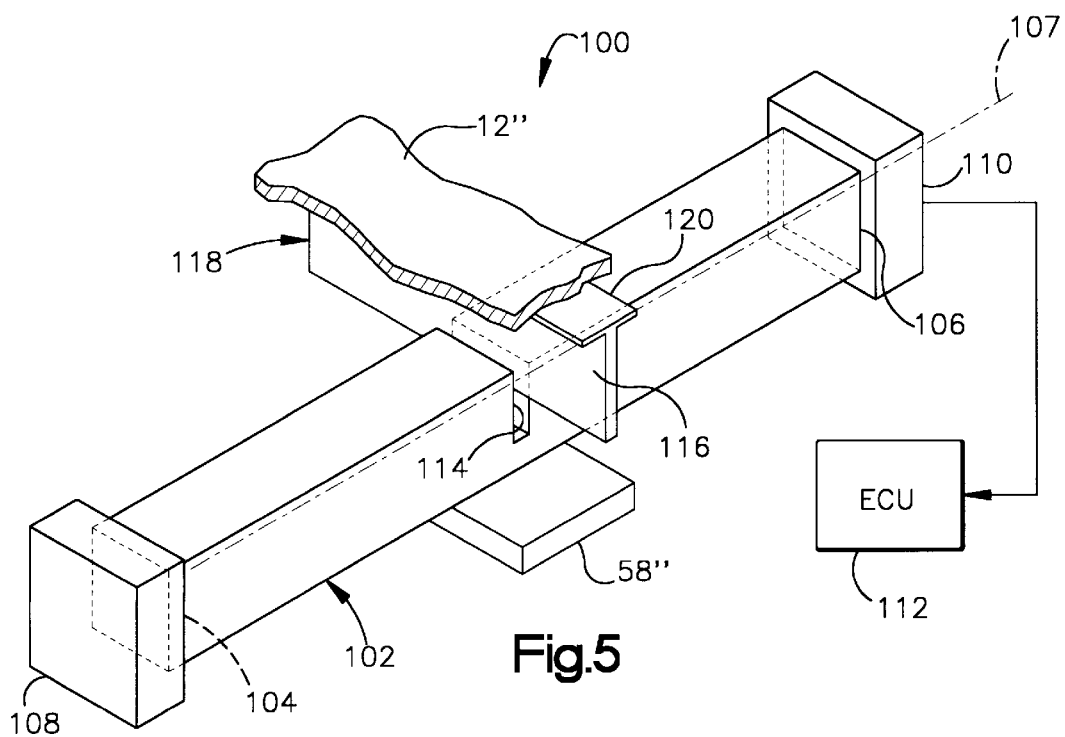
FIG. 5 is a schematic view of still another embodiment of a weight sensor in accordance with the present invention.

FIG. 5 illustrates still another embodiment of a weight sensor, indicated as 100, in accordance with the present invention. In this embodiment, an elongated light guide 102 has first and second ends 104 and 106 and a central longitudinal axis 107 extending therethrough. The light guide 102 is connected between a light emitter 108 and a light detector 110.

The light guide 102 may be formed of a conventional light pipe or a hollow conduit having a highly reflective inner surface. The light detector 110 detects the light received from the emitter 108 and provides a signal indicative thereof to an ECU 112. The light guide 102 also includes a slot 114 formed in the light guide 102 substantially transverse to the axis 107. A planar sheet 116 of substantially opaque material may traverse within the slot 114 to impede the passage of light through the light guide 102.

Preferably, the sheet 116 is part of a shutter assembly 118 that includes an upper portion 120, which may be mounted between a lower portion of a vehicle seat, indicated schematically as 12", and a seat rail, indicated as 58". The shutter assembly 118 is configured to effect movement of the sheet 116 within the slot 114 transverse to the longitudinal axis 107 of the light guide 102. The shutter assembly 118 moves the sheet 116 a predetermined amount into the slot 114 in response to the load applied to the vehicle seat (not shown).

This reduces the intensity of light received by the detector 110 from the emitter 108.

It is desirable to prevent the escape of light from the slot 114 and entry of extraneous light through the slot 114. Therefore, the shutter assembly 118 and at least a portion of the light guide 102 may be mounted within an appropriate enclosure (not shown).

Now that the structure of several embodiments of the present invention have been described, an example of their operation in a vehicle may be better understood with reference to FIG. 1. Each of the members 50, 52, 54 and 56 will impede varying amounts of light through the respective light guides 26, 28, 30 and 32 according to the load applied to the seat 14. The signals provided by the detectors 18, 20, 22, and 24 may be used by the ECU to determine a weight value associated with the load applied to the seat 14. At least a portion of the forces due to weight of an individual's legs typically will be transferred to the floor. Thus, the weight value may be an estimate the actual weight of the occupant.

The signals from the detectors 18, 20, 22 and 24 also may be used to determine the position of the center of gravity of the applied load. These determinations may be made simultaneously by the ECU 27 from the same detector signals. The ECU 27 may determine the center of gravity based upon ratios of the signal values associated with different pairs of the detectors 18, 20, 22 and 24. For example, when an individual is in the seat 14, the individual may shift from side-to-side or from front-to-back. Each time the individual leans or shifts, the individual's center of gravity will shift accordingly. This results in the associated members 50, 52, 54 and 56 impeding the passage of light through the respective light guides 26, 28, 30 and 32 to reflect movement of the individual's center of gravity. More specifically, when an individual leans to his/her left, the light detectors 20 and 22, which for purposes of illustration are connected to respective members 52 and 54 on the left, will detect a corresponding decrease in light received from the emitter 16. Similarly, the detectors 18 and 24, which are associated with the right side, will detect a corresponding increase in the amount of light received. The detectors 18, 20, 22 and 24 provide signals to the ECU 27 indicative of such changes in the amount of light detected.

A reference signal from detector 25 also is supplied to the ECU 27 to provide a reference value for compensation of the weight sensor 10. The ECU 27 may compensate for coupling losses, environmental effects and for other changes within the sensor 10 based upon a comparison between the signal from the reference detector 25 and the signals from the other detectors 18, 20, 22 and 24.

Preferably, the detectors 18, 20, 22, 24 and 25 provide sampled data to the ECU at a sufficiently rapid rate, such that a substantially real-time determination of the occupant's center of gravity or weight may accurately be made. As stated with respect to FIG. 4, the signal from the reference detector 25 provides a baseline measurement under zero load. The ECU 27 uses this signal to actively compensate for environmental changes and inefficiencies of the weight sensor 10 which are not due to the applied load.

The center of gravity and weight information may be provided to other vehicle systems, such as an occupant protection system or other systems that might require such information.

From the above description of the invention, those skilled in the art will perceive improvements, changes and modifications. Such improvements, changes and modifications are considered to be within the skill of the art and are intended to be covered by the appended claims.

Having described preferred embodiments of the invention, the following is claimed:

1. A vehicle seat weight sensor comprising:
   a light source for providing a predetermined amount of light;
   a light detector for detecting light from said light source and providing a signal indicative thereof;
   a member for mounting to a vehicle seat and impeding passage of light between said light source and said light detector according to a load applied to the vehicle seat; and
   an electronic control device coupled to said light detector for determining, in response to said light detector signal, a weight value according to the load applied to the vehicle seat.

2. The weight sensor of claim 1 further comprising a light guide having first and second ends, said light guide first end connected to said light source and said light guide second end connected to said light detector, said light detector detecting light from said light source at said light guide second end, and said member impeding passage of light between said light guide first and second ends according to the load applied to the vehicle seat.

3. The weight sensor of claim 2 wherein said light guide comprises an optical cable.

4. The weight sensor of claim 1 wherein said member is mounted to a lower portion of the vehicle seat.

5. The weight sensor of claim 1 further comprising:
   a reference light detector detecting unimpeded light from said light source and providing to said electronic control device a reference signal indicative thereof.

6. A vehicle seat weight sensor comprising:
   a light source for providing light;
   an elongated first light guide having first and second ends and a central axis extending longitudinally through said light guide, said light source providing light to said light guide first end;
   a first light detector for detecting light at said first light guide second end and providing a signal indicative thereof;
   a member for mounting to a vehicle seat for impeding passage of light between said light guide first and second ends according to a load applied to the vehicle seat; and
   an electronic control device responsive to said first light detector signal for determining a weight value according to the load applied to the vehicle seat.

7. The weight sensor of claim 6 wherein said first light guide comprises a resilient optical cable.

8. The weight sensor of claim 7 wherein said member comprises a plunger assembly which, in response to the load applied to the vehicle seat, compresses said optical cable to impede the passage of light through said optical cable.

9. The weight sensor of claim 6 wherein said member comprises a sheet of substantially opaque material.

10. The weight sensor of claim 9 wherein said first light guide comprises a slot substantially transverse to said first light guide axis for receiving said sheet to impede the passage of light through said first light guide.

11. The weight sensor of claim 6 further comprising:
   an elongated reference light guide having first and second ends, said light source providing light to said first end of said reference light guide;
   a reference light detector for detecting light at said second end of said reference light guide and providing a signal indicative thereof.

12. The weight sensor of claim 11 wherein said control device compensates said first light detector signal in response to said reference light detector signal.

13. The weight sensor of claim 6 further comprising:

a plurality of light guides having first and second ends, said light source providing a predetermined amount of light to each of said light guide first ends;

a plurality of light detectors, each of said light detectors associated with a respective one of said light guides for detecting light at said second end of said respective one of said light guides, each of said light detectors providing to said control device a signal indicative of the amount of light detected thereby; and a member for mounting to a vehicle seat for impeding passage of light through at least one of said light guides in response to a load applied to the vehicle seat;

said control device determining a weight value according to said plurality of light detector signals.

14. The weight sensor of claim 13 wherein said control device further determines a center of gravity of the load applied to the vehicle seat according to said light detector signals.

15. The weight sensor of claim 13 wherein at least one of said plurality of light detectors is a reference light detector for detecting unimpeded light from said light source and providing a reference signal to said control device for compensating other of said light detector signals.

16. A vehicle seat weight sensor comprising:

a light source for providing light;

a light detector for detecting the light from said light source and providing a signal indicative thereof;

a member for mounting to a vehicle seat and impeding passage of light between said light source and said light detector in response to a load applied to said vehicle seat; and a control device electrically coupled to said light detector for determining, in response to said light detector signal, a value in accordance with the load applied to the vehicle seat.

17. The weight sensor of claim 16 wherein said value is indicative of a weight of the load applied to the seat.

18. The weight sensor of claim 16 wherein said value is indicative of a center of gravity of the load applied to the seat.

* * * * *